United States Patent
Tiboni et al.

(10) Patent No.: US 10,576,899 B2
(45) Date of Patent: Mar. 3, 2020

(54) DEPLOYABLE STORAGE POCKET FOR A VEHICLE

(71) Applicant: GM GLOBAL TECHNOLOGY OPERATIONS LLC, Detroit, MI (US)

(72) Inventors: Adelchi R. Tiboni, São Paulo (BR); Fernando A. Siqueira, São Paulo (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/040,585

(22) Filed: Jul. 20, 2018

(65) Prior Publication Data
US 2020/0023781 A1    Jan. 23, 2020

(51) Int. Cl.
*B60R 7/04*    (2006.01)
*B60R 13/02*    (2006.01)

(52) U.S. Cl.
CPC ............... *B60R 7/04* (2013.01); *B60R 13/02* (2013.01)

(58) Field of Classification Search
CPC ............ B60R 7/04; B60R 7/046; B60R 7/005
USPC ..................................... 296/378, 37.13, 37.8
See application file for complete search history.

(56) References Cited

U.S. PATENT DOCUMENTS

| | | | |
|---|---|---|---|
| 5,261,716 A | 11/1993 | Phelps | |
| 8,714,613 B1* | 5/2014 | Gillis | B60R 7/04 296/24.34 |
| 9,421,916 B1 | 8/2016 | Dyle | |
| 2005/0252940 A1* | 11/2005 | Brandstetter | B60R 7/046 224/543 |
| 2005/0274762 A1* | 12/2005 | Belokin | B60R 7/04 224/543 |
| 2008/0001423 A1* | 1/2008 | Ercolano | B60R 7/005 296/37.8 |
| 2014/0197657 A1* | 7/2014 | Gillis | B60R 7/04 296/37.8 |
| 2016/0325688 A1* | 11/2016 | Dyle | B60R 7/046 |

* cited by examiner

*Primary Examiner* — Jason S Morrow

(57) ABSTRACT

A vehicle includes a panel defining a portion of an interior area in the vehicle and having a concave shape, and a reversible pocket configured to be attached to the panel in a stowed configuration in which the reversible pocket conforms to the concave shape of the panel and a deployed configuration in which the reversible pocket extends into the cargo area and defines a storage area together with the concave shape of the panel.

18 Claims, 2 Drawing Sheets

DEPLOYABLE STORAGE POCKET FOR A VEHICLE

FIELD

The present disclosure relates to a deployable storage pocket for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Many vehicles include an interior area. The interior area may be described as, for example, a cargo area like a trunk when associated with a sedan, but may also include other areas, such as the rearward space in an SUV or a van, the bed of a truck, a passenger area, an interior of a door, or other interior surface, without limitation. Often, the interior area of a vehicle is equipped with a storage/organizational bin or net, in which objects may be placed so that the objects do not move during operation of the vehicle. However, these storage bins or nets take up a volume of space that could otherwise be made available for other items. In particular, these storage devices may intrude into the volume of an interior area and limit the size of objects that may be placed into the interior area.

SUMMARY

In an exemplary aspect, a vehicle includes a panel defining a portion of a interior area in the vehicle and having a concave shape, and a reversible pocket configured to be attached to the panel in a stowed configuration in which the reversible pocket conforms to the concave shape of the panel and a deployed configuration in which the reversible pocket extends into the cargo area and defines a storage area together with the concave shape of the panel.

In this manner, a deployable storage pocket for a panel in an interior area of a vehicle may be selectively configured to be deployed such that it provides a storage pocket for smaller items or to be stowed away such that it does not intrude into the volume of an interior area and, therefore, does not interfere with the ability of the storage area to receive larger items, such as, for example, large luggage and the like.

In another exemplary aspect, the panel further includes a plurality of connectors adapted to attach the reversible pocket in either of the stowed configuration and the deployed configuration.

In another exemplary aspect, each of the plurality of connectors includes a protrusion extending from a surface of the panel.

In another exemplary aspect, the reversible pocket further includes an opening that is adapted to receive a corresponding one of the plurality of connectors when in the stowed configuration and the deployed configuration.

In another exemplary aspect, each of the protrusions further includes a vertically upward extending portion.

In another exemplary aspect, a vertical extent of the opening is larger than a vertical extent of the vertically upward extending portion.

In another exemplary aspect, each of the vertically upward extending portions further includes a dimple extending toward the panel.

In another exemplary aspect, the reversible pocket further includes an indent each for receiving a corresponding one of the dimples in each of the stowed configuration and the deployed configuration.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
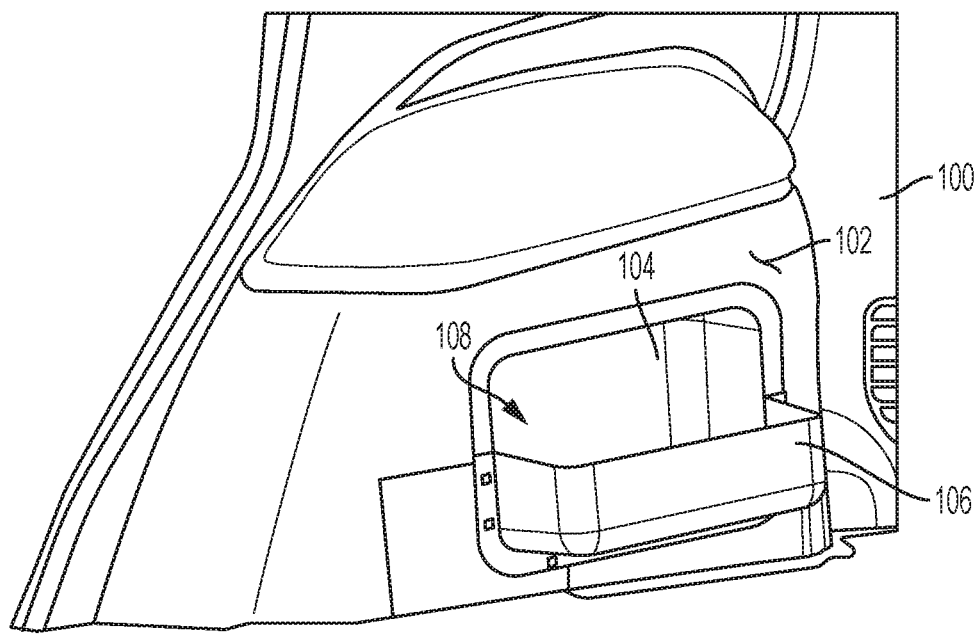
FIG. 1 is a perspective view of a vehicle with a deployable storage pocket in accordance with an exemplary embodiment of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures. In FIG. 1, a vehicle is generally shown at 100. The vehicle 100 may include any style and/or configuration of vehicle 100, such as but not limited to a sedan, SUV, van, truck, tractor, boat, airplane, etc. The vehicle 100 includes a panel 102. The panel 102 may, for example, include an interior trim panel 102 disposed within an interior space of the vehicle 100. It should be appreciated that the panel 102 may be disposed anywhere within the interior of the vehicle 100, including but not limited to on a door panel, on an interior console panel, on a seatback panel, etc. In other embodiments, the panel 102 may be disposed on exterior features of the vehicle 100 including, but not limited to, a side wall or tailgate of a vehicle 100 having a pick-up truck box. In some examples, the panel 102 is generally positioned in a substantially vertical orientation, such that the panel 102 extends in a generally vertical direction relative to a ground surface. The panel 102 along with other portions of the vehicle (not shown) define a cargo area in which items may be positioned for transport within the vehicle 100.

The panel 102 includes a recessed area 104 having a concave shape. Attached to the panel 102 is a reversible pocket 106. In FIG. 1, the reversible pocket 106 is attached to the panel 102 in its deployed configuration such that the pocket 106 extends away from the panel 102 and into the interior area to define a storage volume 108 in which items may be positioned and stored for transport. In this manner, items having a dimension small enough to fit within the volume 108 may be reliably positioned and stored for transport and not be left unsecured within the much larger interior volume.

Figure 2:
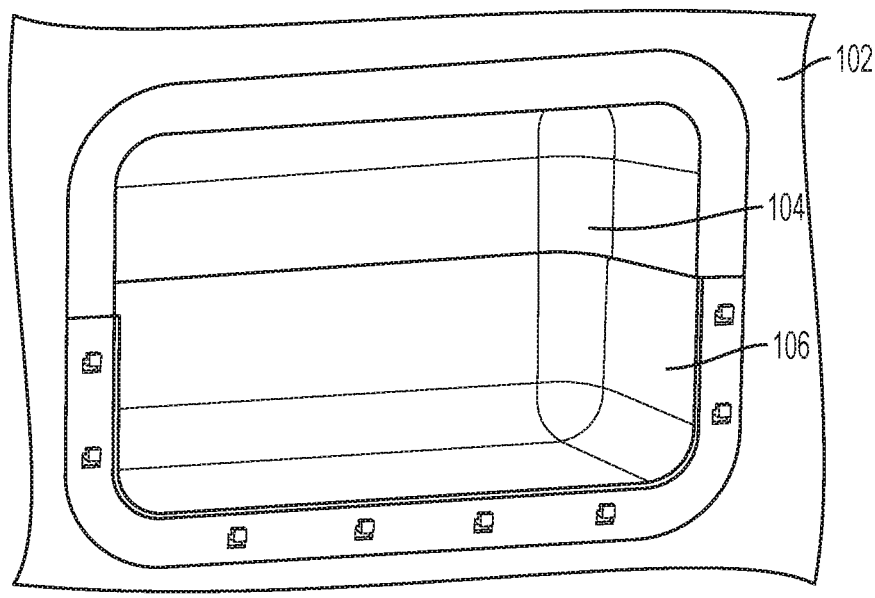
FIG. 2 is a perspective view of the storage pocket of FIG. 1 in a stowed configuration.

Referring now to FIG. 2, the reversible pocket 106 is connected to the panel 102 in its stowed configuration. As is clearly illustrated by FIG. 2, the reversible pocket 106 has a shape which conforms to the concave shape of the recessed area 104 of the panel 102. In this stowed configuration, the reversible pocket 106 no longer extends into the interior area (as in the deployed configuration of FIG. 1) and, therefore, does not occupy any volume within the interior area. Thus, in the stowed configuration, the reversible pocket 106 would not interfere with any items which may be stored within the interior area of the vehicle 100, such as, for example, large luggage or the like.

Figure 3:
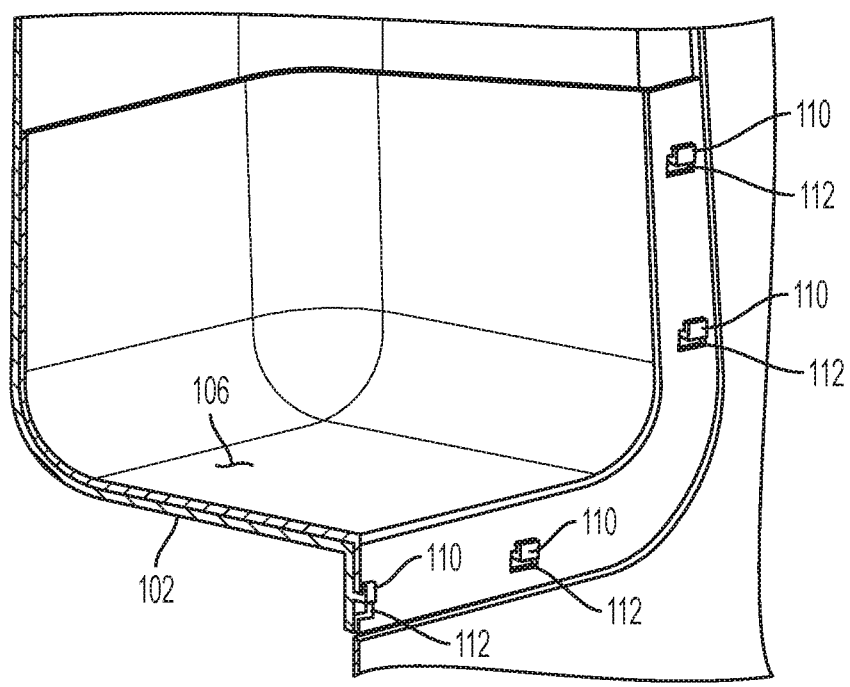
FIG. 3 is a cut-away perspective view of the storage pocket of FIG. 2.

FIG. 3 illustrates a cut-away perspective view of the storage pocket of FIG. 2 with the reversible pocket 106 attached to the panel 102 in its stowed configuration. The panel 102 includes a plurality of connectors 110 which cooperate with a plurality of openings 112 in the pocket 106 to attach the pocket 106 to the panel 102. FIG. 3 further illustrates that the shape of the pocket 106 conforms to the concave shape of the panel 102.

Figure 4:
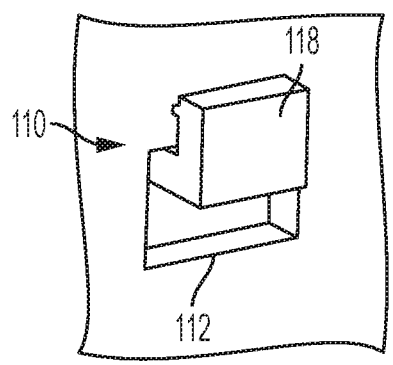
FIG. 4 is a close-up perspective view of the storage pocket of FIG. 2.
Figure 5:
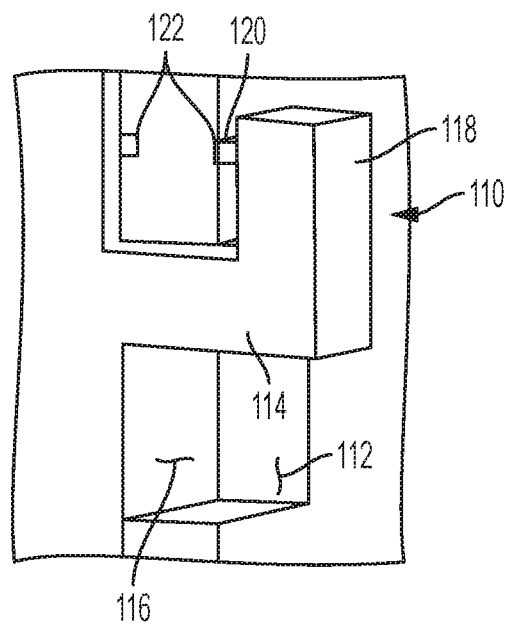
FIG. 5 is a close-up, cut-away perspective view of the storage pocket of FIG. 2.

Referring now to FIGS. 4 and 5, the details of the connectors 110 which cooperate with the openings 112 in the pocket 106 to reversibly connect the pocket 106 to the panel 102 in either its deployed or stowed configuration is more clearly illustrated. The connectors 110 each form a protrusion 114 that extends from a surface 116 of the panel 102 toward the cargo area of the vehicle 100. Each of the protrusions 114 further include a vertically upward extending portion 118. The vertical extent of each of the openings 112 is larger than the vertical extent of each of the vertically upward extending portions 118 such that each of the vertically upward extending portions 118 may pass through a corresponding opening 112. Once the vertically upward extending portion 118 passes through the corresponding opening 112, the pocket 106 may then rest on the protrusion 114 and, thereby, be positioned between each of the vertically upward extending portions 118 and the surface 116 of the panel 102. In this manner, the pocket 106 may be securely connected to the panel 102 in either of the deployed or stowed configurations.

Optionally, as is illustrated in FIG. 5, each of the vertically upward extending portions 118 may include a dimple 120 that extends toward the surface 116 of the panel 102. The pocket 106 may then further include a corresponding plurality of indents 122 on each side of the pocket 106 and above each opening 112 such that each dimple 120 is received in a corresponding indent when the panel is positioned in either of the deployed or stowed configurations. In this manner, the pocket 106 may be more securely fixed to the panel 102 with the plurality of connectors 110.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle comprising:
   a panel defining a portion of an interior area in the vehicle and having a concave surface with a concave shape; and
   a reversible pocket configured to be attached to the panel in a stowed configuration in which the reversible pocket conforms to the concave shape of the panel and a deployed configuration in which the reversible pocket extends into the interior area and defines a storage area together with the concave shape of the panel, wherein the reversible pocket includes a convex surface which faces toward the concave surface of the panel in the stowed configuration and away from the concave surface of the panel in the deployed configuration.

2. The vehicle of claim 1, wherein the panel further comprises a plurality of connectors adapted to attach the reversible pocket in either of the stowed configuration and the deployed configuration.

3. The vehicle of claim 2, wherein each of the plurality of connectors comprises a protrusion extending from a surface of the panel.

4. The vehicle of claim 3, wherein the reversible pocket further comprises an opening that is adapted to receive a corresponding one of the plurality of connectors when in the stowed configuration and the deployed configuration.

5. The vehicle of claim 4, wherein each of the protrusions further comprises a vertically upward extending portion.

6. The vehicle of claim 5, wherein a vertical extent of the opening is larger than a vertical extent of the vertically upward extending portion.

7. The vehicle of claim 5, wherein each of the vertically upward extending portions further comprise a dimple extending toward the panel.

8. The vehicle of claim 7, wherein the reversible pocket further comprises an indent each for receiving a corresponding one of the dimples in each of the stowed configuration and the deployed configuration.

9. A deployable storage pocket for a vehicle, the storage pocket comprising:
   a panel defining a portion of a cargo area in the vehicle and having a concave surface with a concave shape; and
   a reversible pocket configured to be attached to the panel in a stowed configuration in which the reversible pocket conforms to the concave shape of the panel and a deployed configuration in which the reversible pocket extends into the cargo area and defines a storage area together with the concave shape of the panel, wherein the reversible pocket includes a convex surface which faces toward the concave surface of the panel in the stowed configuration and away from the concave surface of the panel in the deployed configuration.

10. The pocket of claim 9, wherein the panel further comprises a plurality of connectors adapted to attach the reversible pocket in either of the stowed configuration and the deployed configuration.

11. The pocket of claim 10, wherein each of the plurality of connectors comprises a protrusion extending from a surface of the panel.

12. The pocket of claim 11, wherein the reversible pocket further comprises an opening that is adapted to receive a corresponding one of the plurality of connectors when in the stowed configuration and the deployed configuration.

13. The pocket of claim 12, wherein each of the protrusions further comprises a vertically upward extending portion.

14. The pocket of claim 13, wherein a vertical extent of the opening is larger than a vertical extent of the vertically upward extending portion.

15. The pocket of claim 13, wherein each of the vertically upward extending portions further comprise a dimple extending toward the panel.

16. The pocket of claim 15, wherein the reversible pocket further comprises an indent each for receiving a corresponding one of the dimples in each of the stowed configuration and the deployed configuration.

17. The vehicle of claim 1, wherein the convex surface of the reversible pocket contacts the concave surface of the panel when in the stowed configuration.

18. The pocket of claim 9, wherein the convex surface of the reversible pocket contacts the concave surface of the panel when in the stowed configuration.

\* \* \* \* \*